United States Patent [19]
Watanabe et al.

[11] Patent Number: 6,042,385
[45] Date of Patent: Mar. 28, 2000

[54] CONNECTOR FOR CHARGING

[75] Inventors: Kunihiko Watanabe, Yokkaichi; Shuji Arisaka, Osaka, both of Japan

[73] Assignees: Sumitomo Wiring Systems, Ltd., Mie; Sumitomo Electric Industries, Ltd., Osaka, both of Japan

[21] Appl. No.: 08/882,139

[22] Filed: Jun. 25, 1997

[30]     Foreign Application Priority Data

Jun. 27, 1996  [JP]  Japan .................................. 8-167869
Apr. 30, 1997  [JP]  Japan .................................. 9-112919

[51] Int. Cl.⁷ .................................................. H01R 11/01
[52] U.S. Cl. .............................................. 439/38; 439/950
[58] Field of Search ........................ 439/38, 950; 336/83, 336/212, 216, DIG. 2; 320/108

[56]             References Cited

U.S. PATENT DOCUMENTS

| 3,146,954 | 9/1964  | Hochstein . |
| 5,506,560 | 4/1996  | Takeuchi et al. ........................ 336/83 |
| 5,539,296 | 7/1996  | Ito ............................................. 320/2 |
| 5,821,731 | 10/1998 | Kuki et al. .............................. 320/108 |

FOREIGN PATENT DOCUMENTS

| 0357829    | 3/1990  | European Pat. Off. . |
| B-11 16 305 | 11/1961 | Germany . |
| 5-258962   | 10/1993 | Japan . |
| 6-14470    | 1/1994  | Japan . |

OTHER PUBLICATIONS

U.S. Patent Application No. 08/882,149 (filed Jun. 25, 1997).

Primary Examiner—Steven L. Stephan
Assistant Examiner—Eugene G. Byrd
Attorney, Agent, or Firm—Oliff & Berridge, PLC

[57]             ABSTRACT

A connector for charging includes: a power supply connector element having a primary coil to be connected to a charging power source and a first core; and a vehicle connector element having a secondary coil to be connected to a battery mounted on a vehicle and a second core, the first and second cores constituting a magnetic circuit which passes through the primary and secondary coils, thereby allowing the battery to be charged by an electromotive power induced in the secondary coil, wherein a region occupied by one of the first and second cores is smaller than a region occupied by the other of the first and second cores.

10 Claims, 7 Drawing Sheets

CONNECTOR FOR CHARGING

BACKGROUND OF THE INVENTION

1. Field of the Invention

The invention relates to a connector for charging which is used for charging an electric vehicle.

2. Description of the Related Art

Conventionally, a connector for charging which is practically used for charging an electric vehicle comprises a vehicle connector element which is connected to a battery mounted on an electric vehicle and which is mounted on the vehicle, and a power supply connector element which is connected to a charging power source disposed outside the vehicle. The connector elements are fitted into each other, and a power is then supplied from the charging power source to the battery mounted on the vehicle, thereby conducting the charging operation. Namely, such a connector is configured so that the current path is established by fittingly contacting male and female terminals of the connector elements with each other. Therefore, a connector of the prior art has a problem in that a large resistance is produced in the fitting operation.

As a countermeasure to the above, it may be contemplated to employ a method in which the charging operation is conducted without producing a fitting direct contact between the two connector elements. In the method, each of the vehicle connector element and the power supply connector element is configured so as to have a core and a coil, and a magnetic circuit which passes through both the coils is constituted by both the cores, and then a power is supplied from a power source to a vehicle by means of an electromotive power induced by the coil of the vehicle connector element.

In this case, however, the cores and coils for forming a magnetic circuit are necessary to cause the connector to become large and heavy.

In the vehicle connector element, for example, this produces following problems. The vehicle connector element is to be always mounted on an electric vehicle. When the vehicle connector element is large, therefore, a large mounting space must be prepared in the vehicle body and severe restrictions are imposed on the design of the vehicle body. Further, when the vehicle connector element is heavy, the running performance is impaired.

Occasionally, the power supply unit may be configured as a handy type one so as to be portable. In such a case, the power supply connector element must be configured so as to be small and light.

SUMMARY OF THE INVENTION

The invention has been conducted in view of the above-mentioned circumstances. It is an object of the invention to reduce the size and weight of one of a power supply connector element and a vehicle connector element.

The foregoing object of the invention is achieved by providing a connector for charging having: a power supply connector element having a primary coil to be connected to a charging power source and a first core; and a vehicle connector element having a secondary coil to be connected to a battery mounted on a vehicle and a second core, the first and second cores constituting a magnetic circuit which passes through the primary and secondary coils, thereby allowing the battery to be charged by an electromotive power induced in the secondary coil, wherein a region occupied by one of the first and second cores is smaller than a region occupied by the other of the first and second cores.

According to the invention, in the magnetic circuit, the region occupied by the core of the one connector element is smaller than that occupied by the core of the other connector element. Therefore, the core of the one connector element can be made small and light. The decision on which one of the vehicle connector element and the power supply connector element is to be made small and light may be arbitrarily done in accordance with the use condition.

BRIEF DESCRIPTION OF THE DRAWING FIGURES

DETAILED DESCRIPTION OF THE PREFERRED EMBODIMENTS

<Embodiment 1>

Figure 1:
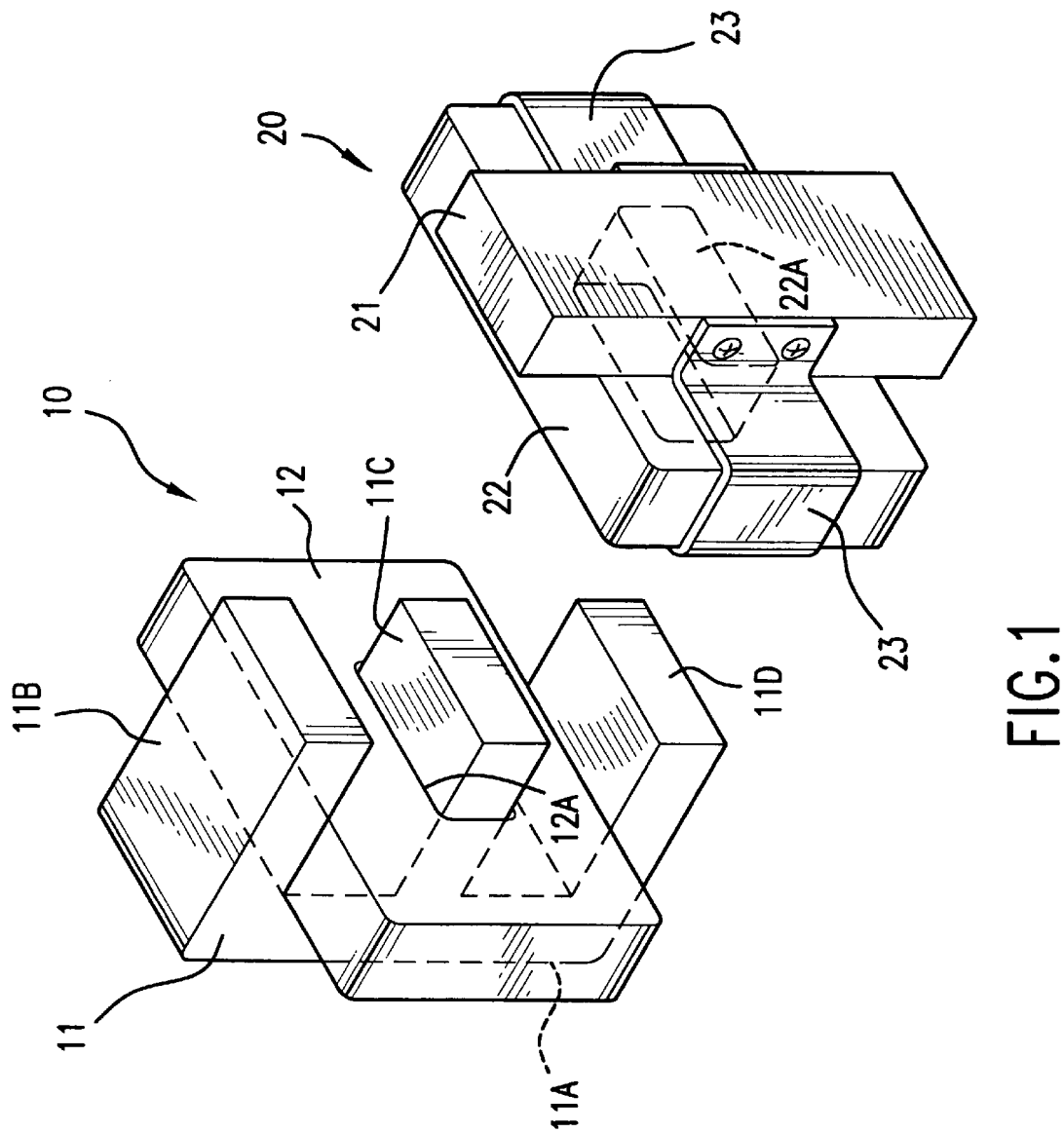
FIG. 1 is a perspective view showing Embodiment 1 in a state where a power supply connector element and a vehicle connector element are separated from each other.
Figure 2:
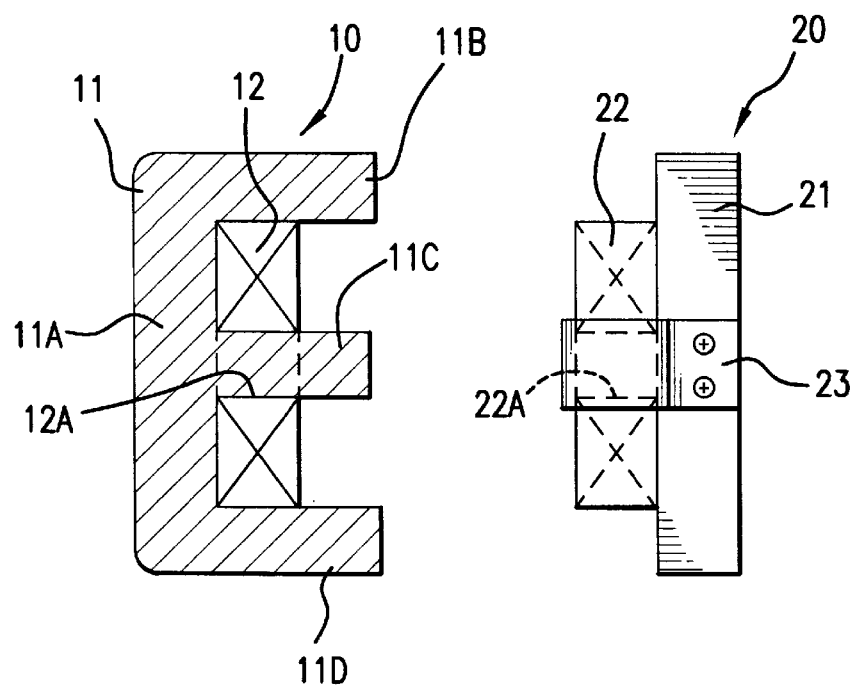
FIG. 2 is a section view showing Embodiment 1 in a state where the power supply connector element and the vehicle connector element are separated from each other.
Figure 3:
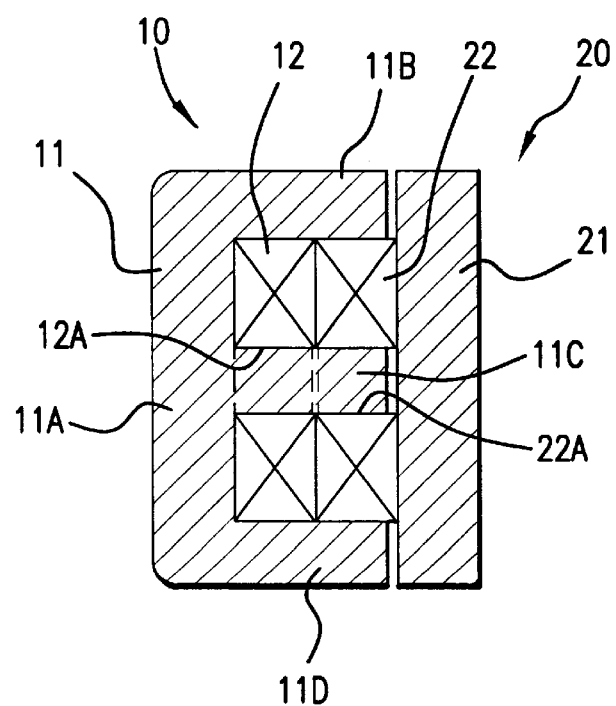
FIG. 3 is a section view showing Embodiment 1 in a state where the power supply connector element and the vehicle connector element are connected to each other.

Hereinafter, Embodiment 1 in which the invention is embodied will be described with reference to FIGS. 1 to 3.

The connector for charging of the invention has a power supply connector element (the one connector which is a component of the invention) 10, and a vehicle connector element (the other connector which is another component of the invention) 20.

The power supply connector element 10 comprises a core 11 made of, for example, ferrite, and a primary coil 12 which is formed by winding a wire (not shown). The core 11 has an "E-like shape" as seen from the side, and comprises the body 11A which vertically elongates in the figure, and three projections 11B, 11C, and 11D which are respectively protruded from the front face (the face opposing the vehicle connector element) of the upper and lower ends and the center position of the body 11A toward the vehicle connector element. The primary coil 12 which has a rectangular shape as whole is attached to the center projection 11C by inserting the projection into a center hole 12A of the coil 12. The upper and lower portions of the primary coil 12 laterally pass through the space between the center projection 11C and the upper projection 11B, and that between the center projection 11C and the lower projection 11D. The right and left side portions of the primary coil 12 are protruded from the core 11 to the outside.

The thickness of the primary coil 12 is about one half of the protrusion length of the projections 11B, 11C, and 11D. The primary coil 12 is in close contact with the front face of the body 11A, and the three projections 11B, 11C, and 11D are protruded toward the front side from the primary coil 12.

The primary coil 12 is fixed to the core 11 by fixing means such as a bracket which is not shown. The wire of the primary coil 12 is connected to a charging power source (not shown). The core 11 and the primary coil 12 of the power supply connector element are housed in a housing (not shown) made of, for example, a synthetic resin.

On the other hand, the vehicle connector element 20 has a core 21 made of, for example, ferrite, and a secondary coil 22 which is formed by winding a wire (not shown). The core 21 has an "I-like shape" as seen from the side. The secondary coil 22 which has a rectangular shape as whole is fixed to the front face (the face opposing the power supply connector element 10) of the core 21 by a bracket 23. A center hole 22A of the secondary coil 22 is positioned on the front of the core 21. The upper portion of the secondary coil 22 is at a level which is slightly lower than the upper end of the core 21, and the lower portion of the secondary coil 22 is at a level which is slightly higher than the lower end of the core 21. The right and left side portions of the secondary coil 22 are protruded from the core 21 to the outside.

The thickness of the secondary coil 22 is equal to that of the primary coil 12 of the power supply connector element 10. The wire of the secondary coil 22 is connected to a battery (not shown) mounted on an electric vehicle. The core 21 and the secondary coil 22 are housed in a housing (not shown) made of, for example, a synthetic resin. The thus configured vehicle connector element 20 is fixed to the body (not shown) of the electric vehicle.

When the battery is to be charged, the power supply connector element 10 and the vehicle connector element 20 are placed so as to be close together, and then fitted into each other by a positioning mechanism (not shown) with attaining a predetermined positional relationship. As a result, as shown in FIG. 3, the center projection 11C of the core 11 of the power supply connector element 10 passes through the center hole 22A of the secondary coil 22 of the vehicle connector element 20, and the tip end face of the projection 11C is close to the front face of the core 21 of the vehicle connector element 20. The upper and lower projections 11B and 11D of the power supply connector element 10 are close to the upper and lower end portions of the front face of the core 21 of the vehicle connector element 20, respectively. Consequently, the core 11 of the power supply connector element 10 and the core 21 of the vehicle connector element 20 constitute a magnetic circuit passing through the primary and secondary coils 12 and 22.

When the primary coil 12 is excited by supplying an electric power from the charging power source under this state to excite the primary coil 12, magnetic fluxes are generated in the cores 11 and 21 and an electromagnetic induced current is generated in the secondary coil 22 by an induced electromotive force, thereby charging the battery mounted on the vehicle.

In the magnetic circuit, the region occupied by the core 11 of the power supply connector element 10 and having an "E-like shape" is larger than that occupied by the core 21 of the vehicle connector element 20 and having an "I-like shape." In other words, the core 21 of the vehicle connector element 20 is smaller and lighter than the core 11 of the power supply connector element 10. Therefore, the vehicle connector element 20 is smaller and lighter than the power supply connector element 10.

<Embodiment 2>

Figure 4:
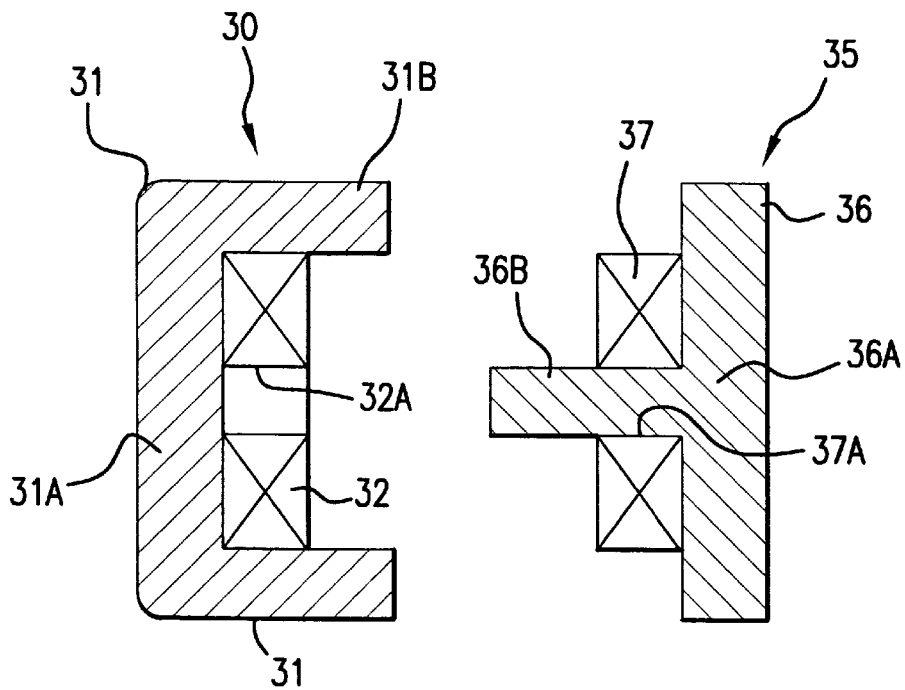
FIG. 4 is a section view showing Embodiment 2 in a state where a power supply connector element and a vehicle connector element are separated from each other.

Hereinafter, Embodiment 2 in which the invention is embodied will be described with reference to FIG. 4.

Embodiment 2 is different from Embodiment 1 in the shapes of the cores of the power supply connector element and the vehicle connector element. The other components are configured in the same manner as those of Embodiment 1.

Therefore, these components are designated by the same reference numerals, and the description of the structure, function, and effect is omitted.

A core 31 of a power supply connector element 30 has a "substantially U-like shape" as seen from the side, and has the body 31A which vertically elongates in the figure, and two projections 31B and 31C which are respectively protruded from the upper and lower ends of the front face (the face opposing a vehicle connector element 35) of the body 31A. On the other hand, a core 36 of the vehicle connector element 35 has a "laterally-directed T-like shape," and has the body 36A which vertically elongates, and one projection 36B which is protruded from the center of the front face (the face opposing the power supply connector element 30) of the body 36A. The projection 36B passes through a center hole 37A of a secondary coil 37.

When the power supply connector element 30 and the vehicle connector element 35 are set to be in the fitted state in which the charging operation is enabled, the projection 36B of the vehicle connector element 35 passes through a center hole 32A of a primary coil 32 of the power supply connector element 30 to be close to the front face of the body 31A of the core 31 of the power supply connector element 30, and the two projections 31B and 31C of the core 31 of the power supply connector element 30 are close to the upper and lower ends of the front face of the core 36 of the vehicle connector element 35. A magnetic circuit constituted by the cores 31 and 36 has the same paths as those in Embodiment 1.

Also in the embodiment, the core 36 of the vehicle connector element 35 is smaller and lighter than the core 31 of the power supply connector element 30. Therefore, the vehicle connector element 35 can be made smaller and lighter than the power supply connector element 30.

<Embodiment 3>

Figure 5:
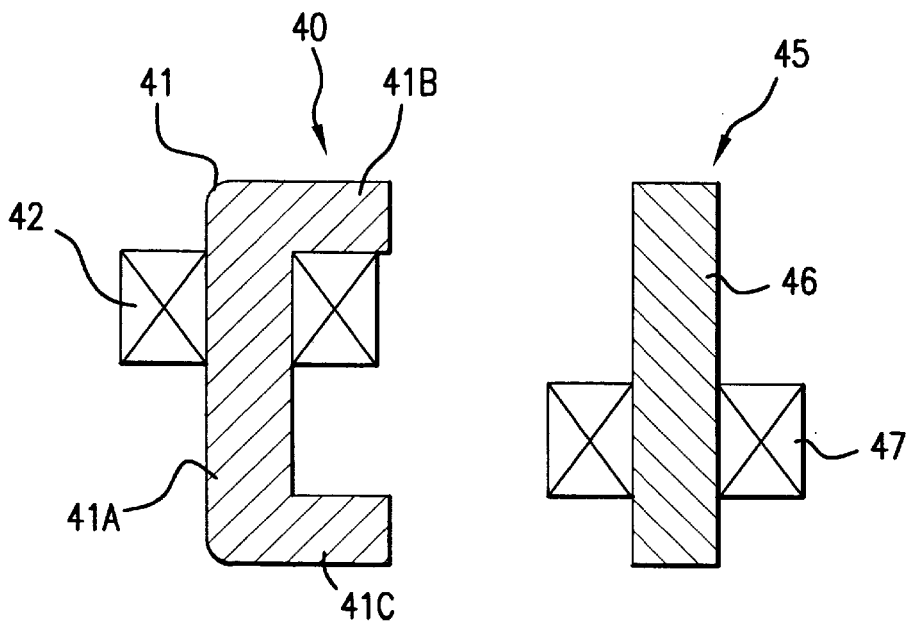
FIG. 5 is a section view showing Embodiment 3 in a state where a power supply connector element and a vehicle connector element are separated from each other.
Figure 6:
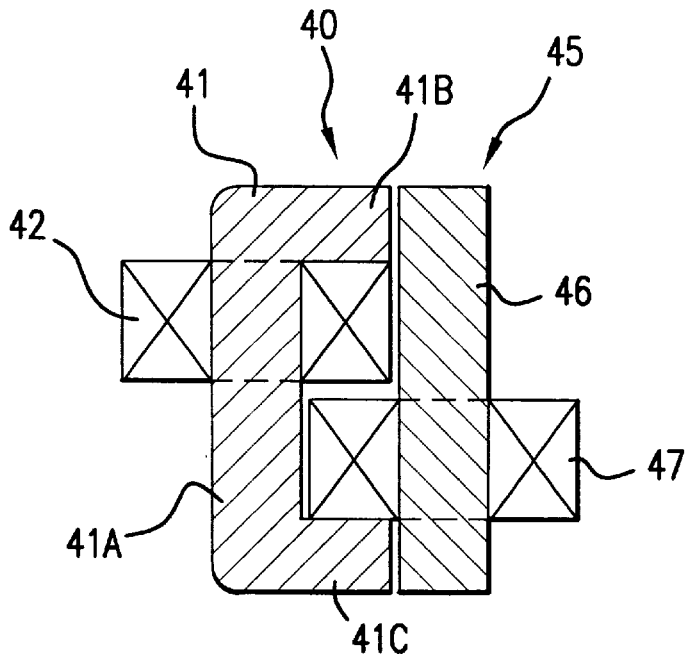
FIG. 6 is a section view showing Embodiment 3 in a state where the power supply connector element and the vehicle connector element are connected to each other.

Hereinafter, Embodiment 3 in which the invention is embodied will be described with reference to FIGS. 5 and 6.

Embodiment 3 is different from Embodiment 1 in the shapes of the cores of the power supply connector element and the vehicle connector element, and also in the manner of attaching the coils to the cores. The other components are configured in the same manner as those of Embodiment 1. Therefore, these components are designated by the same reference numerals, and the description of the structure, function, and effect is omitted.

A core 41 of a power supply connector element 40 has a "substantially U-like shape" as seen from the side, and has the body 41A which vertically elongates, and two projections 41B and 41C which are respectively protruded from the upper and lower ends of the front face (the face opposing a vehicle connector element 45) of the body 41A. A primary coil 42 is wound on the upper half of the body 41A. On the other hand, a core 46 of the vehicle connector element 45 has an "I-like shape.". A secondary coil 47 is wound at a position which is lower than the center of the core 46.

When the power supply connector element 40 and the vehicle connector element 45 are set to be in the fitted state in which the charging operation is enabled, the two projections 41B and 41C of the core 41 of the power supply connector element 40 are close to the upper and lower ends of the front face of the core 46 of the vehicle connector element 45. The cores 41 and 46 constitute a magnetic circuit. The magnetic circuit has an "O-like shape."

Also in the embodiment, the core 46 of the vehicle connector element 45 is smaller and lighter than the core 41 of the power supply connector element 40. Therefore, the vehicle connector element 45 can be made smaller and lighter than the power supply connector element 40.

The number of the projections protruded in the direction along which the cores are closed to and separated from each other is smaller by one than that in Embodiments 1 and 2. Therefore, the cores are made smaller and lighter by the degree corresponding to the reduced number of the projections.

<Embodiment 4>

Figure 7:
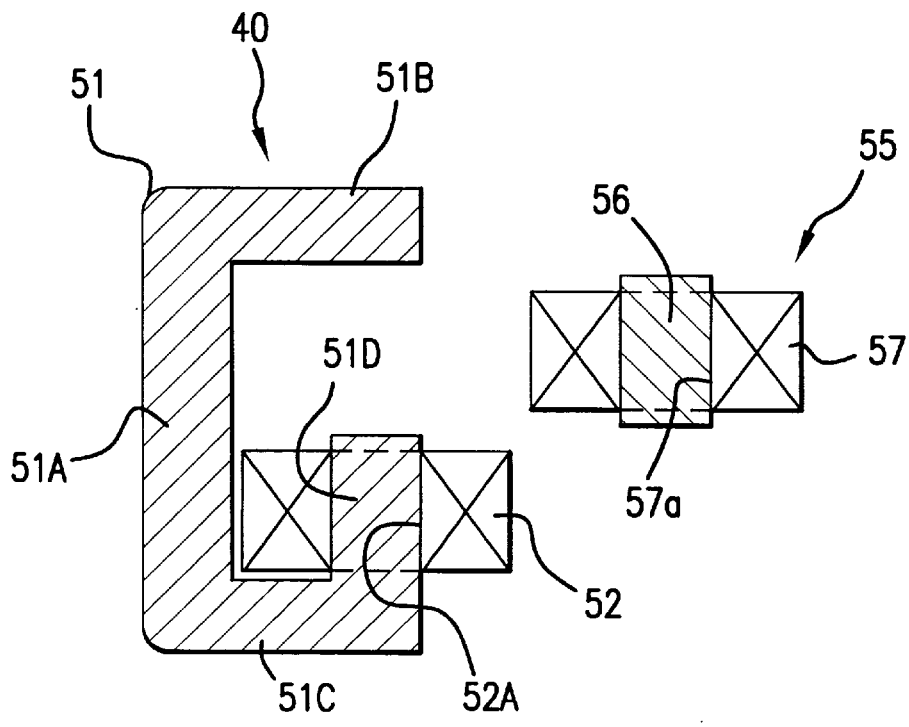
FIG. 7 is a section view showing Embodiment 4 in a state where a power supply connector element and a vehicle connector element are separated from each other.
Figure 8:
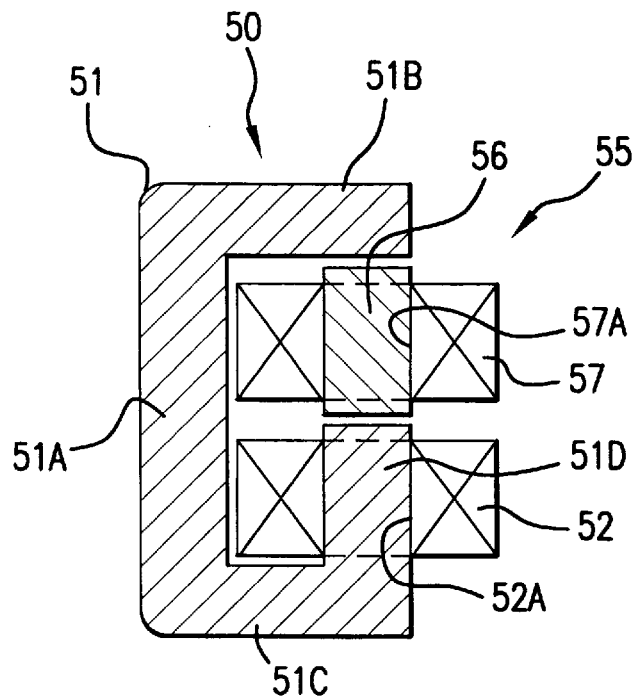
FIG. 8 is a section view showing Embodiment 4 in a state where the power supply connector element and the vehicle connector element are connected to each other.

Hereinafter, Embodiment 4 in which the invention is embodied will be described with reference to FIGS. 7 and 8.

Embodiment 4 is different from Embodiment 3 in the shapes of the cores of the power supply connector element and the vehicle connector element. The other components are configured in the same manner as those of Embodiment 1. Therefore, these components are designated by the same reference numerals, and the description of the structure, function, and effect is omitted.

A core 51 of a power supply connector element 50 has a "G-like shape" as seen from the side, and has the body 51A which vertically elongates, two projections 51B and 51C which are respectively protruded from the upper and lower ends of the front face (the face opposing a vehicle connector element 55) of the body 51A, and a raised portion 51D which is upward protruded from the tip end of the lower projection 51C. A primary coil 52 is wound on the raised portion 51D. On the other hand, a core 56 of the vehicle connector element 55 has a height which is smaller than that of the core 46 of Embodiment 3 and slightly larger than the thickness of a secondary coil 57. The secondary coil 57 is wound on the core 56.

When the power supply connector element 50 and the vehicle connector element 55 are set to be in the fitted state in which the charging operation is enabled, the core 56 of the vehicle connector element 55 enters a gap between the lower face of the tip end of the upper projection 51B of the core 51 of the power supply connector element 50 and the upper end face of the raised portion 51D. The cores 51 and 56 constitute a magnetic circuit having an "O-like shape" in the same manner as Embodiment 3.

Also in the embodiment, the core 56 of the vehicle connector element 55 is smaller and lighter than the core 51 of the power supply connector element 50. Therefore, the vehicle connector element 55 can be made smaller and lighter than the power supply connector element 50.

The number of the projections protruded in the direction along which the cores are closed to and separated from each other is smaller by one than that in Embodiments 1 and 2. Therefore, the cores are made smaller and lighter by the degree corresponding to the reduced number of the projections.

Unlike Embodiment 3, the primary and secondary coils 52 and 57 are arranged in such a manner that center holes 52A and 57A coincide with each other, and hence also the outer dimension in the lateral direction in the figure is smaller.

<Embodiment 5>

Hereinafter, Embodiment 5 in which the invention is embodied will be described with reference to FIGS. 9 and 10.

Embodiment 5 is different from Embodiment 3 in the shapes of the cores of the power supply connector element and the vehicle connector element. The other components are configured in the same manner as those of Embodiment 1. Therefore, these components are designated by the same reference numerals, and the description of the structure, function, and effect is omitted.

A core 71 of a power supply connector element 70 has a "substantially U-like shape" as seen from the side, and has the body 71A which vertically elongates in the figure, and two projections 71B and 71C which are respectively protruded from the upper and lower ends of the front face (the face opposing a vehicle connector element 75) of the body 71A. The projected lengths of the projections 71B and 71C are constituted so as to be longer than that of Embodiment 3. The primary coil 72 is wound on the upper half of the body 71A. On the other hand, a core 76 of the vehicle connector element 75 has an "I-like shape" and has a height which is slightly smaller than a gap between the projections 71B and 71C. The secondary coil 77 is wound on the lower half of the core 76.

When the power supply connector element 70 and the vehicle connector element 75 are set to be in the fitted state in which the charging operation is enabled, the core 76 of the vehicle connector element 75 is positioned so as to be griped between the two projection 71B and 71C. The cores 71 and 76 constitute a magnetic circuit having an "O-like shape" in the same manner as Embodiment 3.

Also in the embodiment, the core 76 of the vehicle connector element 75 is smaller and lighter than the core 71 of the power supply connector element 70. Therefore, the vehicle connector element 75 can be made smaller and lighter than the power supply connector element 70.

Unlike Embodiment 3, the length of the core 76 of the vehicle connector element 75 is relatively short, thereby being smaller and lighter.

<Embodiment 6>

Figure 11:
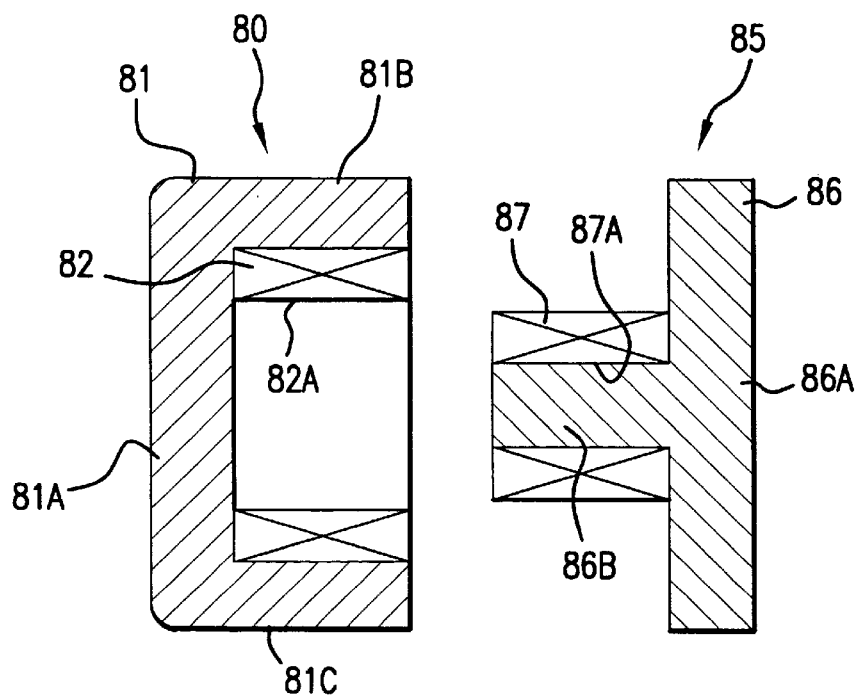
FIG. 11 is a section view showing Embodiment 6 in a state where a power supply connector element and a vehicle connector element are separated from each other.
Figure 12:
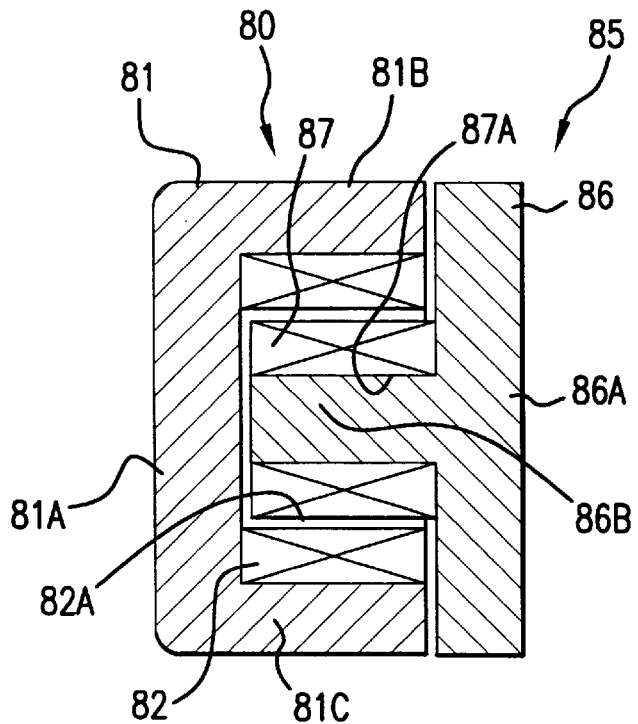
FIG. 12 is a section view showing Embodiment 6 in a state where the power supply connector element and the vehicle connector element are connected to each other.
Figure 13:
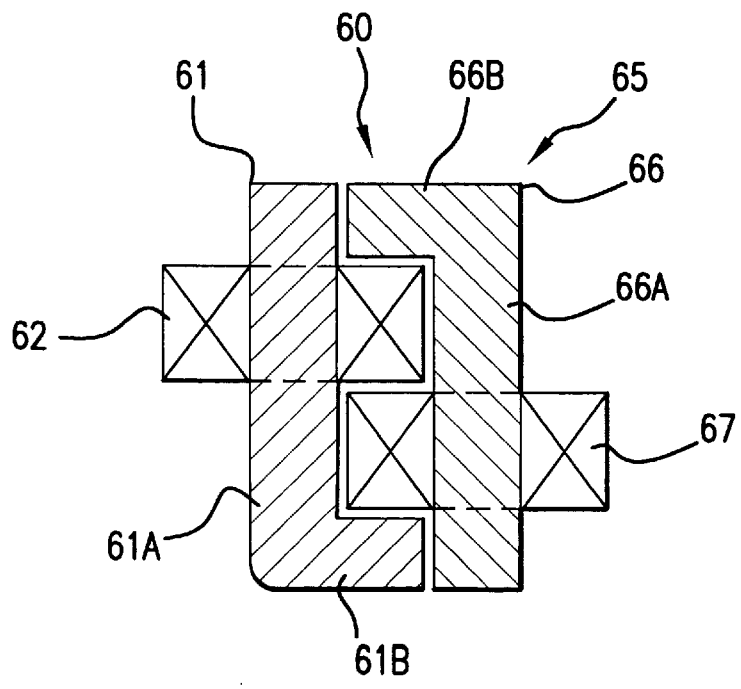
FIG. 13 is a section view showing another embodiment in a state where a power supply connector element and a vehicle connector element are connected to each other.

Hereinafter, Embodiment 6 in which the invention is embodied will be described with reference to FIGS. 11 and 12.

Embodiment 6 is different from Embodiment 2 in the configuration of the coils of the power supply connector element and the vehicle connector element. The other components are configured in the same manner as those of Embodiment 1. Therefore, these components are designated by the same reference numerals, and the description of the structure, function, and effect is omitted.

A core 81 of a power supply connector element 80 has a "substantially U-like shape" as seen from the side, and has the body 81A which vertically elongates in the figure, and two projections 81B and 81C which are respectively protruded from the upper and lower ends of the front face (the face opposing a vehicle connector element 85) of the body 81A. The primary coil 82 has a flat shape in section relatively, comparing with Embodiment 2, and the width thereof extends for all the projected portion of the projections 81B and 81C. Further, an inner periphery of a center hole 82A of the primary coil 82 is larger than that of Embodiment 2.

On the other hand, a core 86 of the vehicle connector element 85 has a "laterally-directed T-like shape," and has the body 86A which vertically elongates, and one projection 86B which is protruded from the center of the front face (the face opposing the power supply connector element 80) of the body 86A. The projection 86B passes through a center hole 87A of a secondary coil 87. The secondary coil 87 has a flat shape in section, which is similar to the primary coil 82, and the width thereof extends for all the projected portion of the projections 86B. Further, an outer periphery of the secondary coil 87 is smaller than that of Embodiment 2.

When the power supply connector element 80 and the vehicle connector element 85 are set to be in the fitted state in which the charging operation is enabled, the projection 86B and the secondary coil 87 of the vehicle connector element 85 are inserted into the center hole 82A of the primary coil 82 so that not only the tip end of the projection 86B is close to the front face of the body 81A of the core 81 of the power supply connector element 80, but also the two projections 81B and 81C of the core 81 of the power supply connector element 80 are close to the upper and lower ends of the front face of the core 86 of the vehicle connector element 85. A magnetic circuit constituted by the cores 81 and 86 has the same paths as those in Embodiment 2.

Also in the embodiment, the core 86 of the vehicle connector element 85 is smaller and lighter than the core 81 of the power supply connector element 80. Therefore, the vehicle connector element 85 can be made smaller and lighter than the power supply connector element 80.

Particularly, in Embodiment 6, the primary and secondary coils 82 and 87 are concentrically arranged to lap the outer periphery of the secondary coil 87 and the inner periphery of the primary coil 82, thereby reducing the magnetic loss.

<Other embodiments>

Figure 9:
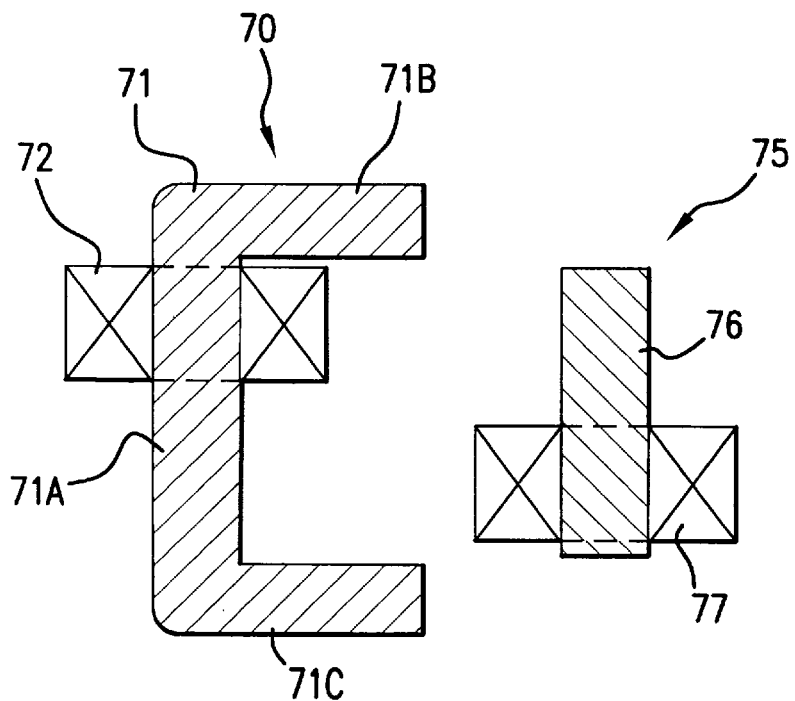
FIG. 9 is a section view showing Embodiment 5 in a state where a power supply connector element and a vehicle connector element are separated from each other.
Figure 10:
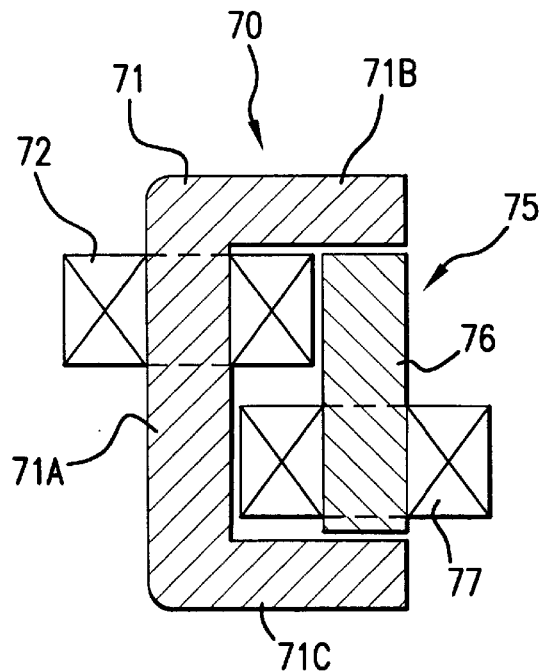
FIG. 10 is a section view showing Embodiment 5 in a state where the power supply connector element and the vehicle connector element are connected to each other.

A technique shown in FIG. 9 may be employed although it is not directly related to the invention.

In the embodiment, the shapes of the cores of the power supply connector element and the vehicle connector element are different from those of Embodiment 3. The other components are configured in the same manner as those of Embodiment 1. Therefore, these components are designated by the same reference numerals, and the description of the structure, function, and effect is omitted.

A core 61 of a power supply connector element 60 has an "L-like shape" as seen from the side, and has the body 61A which vertically elongates, and a projection 61B which is protruded from the lower end of the front face (the face opposing a vehicle connector element 65) of the body 61A. A primary coil 62 is wound at a position which is slightly higher than the center of the body 61A. On the other hand, a core 66 of the vehicle connector element 65 has an "inverted L-like shape" as seen from the side, and has the body 66A which vertically elongates, and a projection 66B which is laterally protruded from the upper end of the front face (the face opposing the power supply connector element 60) of the body 66A. A secondary coil 67 is wound at a position which is slightly lower than the center of the body 66A.

When the power supply connector element 60 and the vehicle connector element 65 are set to be in the fitted state in which the charging operation is enabled, the projections 61B and 66B of the cores 61 and 66 of the connector elements 60 and 65 are close to the upper and lower ends of the front faces of the cores 66 and 61 of the counter connector elements 65 and 60. The cores 61 and 66 constitute a magnetic circuit having an "O-like shape" in the same manner as Embodiment 3. The coils 62 and 67 are arranged in the same manner as those of Embodiment 3.

The number of the projections protruded in the direction along which the cores are closed to and separated from each other is smaller by one than that in Embodiments 1 and 2. Therefore, the cores are made smaller and lighter by the degree corresponding to the reduced number of the projections.

Since the core 61 of the power supply connector element 60 and the core 66 of the vehicle connector element 65 have the same shape and the mutual inverted positional relationships, the production cost can be reduced as compared with the case where cores of different shapes are used.

The invention is not restricted to the embodiments which have been described above with reference to the drawings. For example, also the following embodiments are included in the technical scope of the invention. In addition to the following embodiments, the invention may be executed with being variously modified and within the scope of the invention.

(1) Embodiment 1 may be modified so that a circular recess for housing a coil is formed in the face of the core of the power supply connector element which opposes the vehicle connector element, and the primary coil is housed in the recess.

(2) The shapes of the cores of the power supply connector element and the vehicle connector element are not restricted to those illustrated in the embodiments, and may be realized by combinations of various shapes.

(3) In the embodiments, the vehicle connector element is made smaller and lighter. When the embodiments are modified so that the configurations of the core and coil of the power supply connector element are replaced with those of the core and coil of the vehicle connector element, the power supply connector element can be made smaller and lighter.

(4) In the embodiments, the coil is attached so as to be fixed to the core by fixing means such as a bracket. However, the present invention can be applied to the structure which, for example, the coil and core are separately attached to the connector housing. That is, the connector with the core and coil is included in the present invention, even if the configuration of the attachment of the coil and core are changed.

What is claimed is:

1. A connector for charging comprising:
a power supply connector element having a primary coil to be connected to a charging power source and a first core; and
a vehicle connector element having a secondary coil to be connected to a battery mounted on a vehicle and a second core, said first and second cores constituting a magnetic circuit which passes through said primary and secondary coils, thereby allowing said battery to be charged by an electromotive power induced in said secondary coil, one of said first and second cores formed into an I-like section shape formed in the shape of a rectangular block, the cross-section of the I-like section shape comprising:
a first uninterrupted side face;
a second uninterrupted side face opposing the first uninterrupted side face;
an uninterrupted top face joining the side faces; and
an uninterrupted bottom face joining the side faces and opposing the uninterrupted top face, wherein
a region occupied by one of said first and second cores is smaller than a region occupied by the other of said first and second cores.

2. A connector for charging according to claim 1, wherein one of said first and second cores has an E-like section shape, said primary coil is wound on a center projection of said one core, the other of said first and second cores has an I-like section shape, said secondary coil is attached to a face of said other core, said face opposing the connector element having the E-like section shape, each of said primary coil and said secondary coil having a center hole, said center projection of said one core extending through said center hole of said primary coil and projecting into said center hole of said secondary coil, and said magnetic circuit is configured by causing tip ends of three projections of said one core having an E-like section shape to be connected with center and end portions of said other core having an I-like section shape.

3. A connector for charging according to claim 1, wherein one of said first and second cores has a substantially U-like section shape, said primary coil is wound on said one core, the other of said first and second cores has said I-like section shape, said secondary coil is wound on said other core, and said magnetic circuit is configured by causing end portions of said one core having said U-like section shape to be connected with end portions of said other core having said I-like section shape.

4. A connector for charging comprising:
a power supply connector element having a primary coil to be connected to a charging power source and a first core; and
a vehicle connector element having a secondary coil to be connected to a battery mounted on a vehicle and a second core, said first and second cores constituting a magnetic circuit which passes through said primary and secondary coils, thereby allowing said battery to be charged by an electromotive power induced in said secondary coil, wherein
a region occupied by one of said first and second cores is smaller than a region occupied by the other of said first and second cores; and
one of said first and second cores has a substantially U-like section shape, said primary coil is attached within end portions of said one core, the other of said first and second cores has a substantially T-like section shape, said secondary coil is wound on a center projection of said other core, the primary and secondary coils each having a side laying in a respective plane and a center hole, a center line aligned to each of the center holes, and the side of each of the primary and secondary coils being perpendicular to the center line of each respective center hole, said sides of each of the primary and secondary coils being in contact with each other, and said magnetic circuit is configured so that said primary and secondary coils are concentrically arranged around said projection of said other core by causing said end portions of said one core having said substantially U-like section shape to be connected with end portions of said other core having said substantially T-like section shape and causing a tip end of said projection of said other core to be connected with said center portion of said one core.

5. A connector for charging according to claim 4, wherein an inner periphery of said primary coil laps an outer periphery of said secondary coil.

6. A connector for charging according to claim 1, wherein one of said first and second cores has a substantially G-like section shape, said primary coil is wound on said one core, the other of said first and second cores has said I-like section shape, said I-like section shape being a short I-like section shape which has a width enough that said secondary coil is wound, and said magnetic circuit is configured by causing end portions of said other core having said I-like section shape to be connected with end portions of said one core having said G-like section shape.

7. A connector for charging according to claim 1, wherein said magnetic circuit is constituted in closed loop shape.

8. A connector for charging according to claim 1, wherein each of said first and second cores has a junction face which is contacted to each other when said magnetic circuit is configured, said junction face being perpendicular to an attaching direction of said both connector elements.

9. A connector for charging according to claim 1, wherein each of said first and second cores has a junction face which is contacted to each other when said magnetic circuit is configured, said junction face being parallel to an attaching direction of said both connector elements.

10. A connector for charging according to claim 1, wherein the primary and secondary coils being in contact with each other and each having a side laying in a respective plane and a center hole, a center line aligned to each of the center holes, and the side of each of the primary and secondary coils being perpendicular to the center line of each respective center hole.

* * * * *